United States Patent [19]

Meyer et al.

[11] Patent Number: 5,104,158

[45] Date of Patent: * Apr. 14, 1992

[54] TWO PIECE MOLDED FEMALE COUPLING

[75] Inventors: David W. Meyer, Jordon; Brian J. Blenkush, Maple Grove, both of Minn.

[73] Assignee: Colder Products Company, St. Paul, Minn.

[*] Notice: The portion of the term of this patent subsequent to Oct. 1, 2008 has been disclaimed.

[21] Appl. No.: 708,457

[22] Filed: May 31, 1991

Related U.S. Application Data

[63] Continuation of Ser. No. 519,339, May 2, 1990, which is a continuation of Ser. No. 320,691, Mar. 13, 1989, abandoned.

[51] Int. Cl.$^5$ .............................. F16L 55/00
[52] U.S. Cl. .................... 285/308; 285/317; 285/403
[58] Field of Search ............ 285/23, 317, 308, 305, 285/374, 403, 373

[56] References Cited

U.S. PATENT DOCUMENTS

| | | | |
|---|---|---|---|
| 2,021,241 | 11/1935 | Mall | 285/308 X |
| 2,771,308 | 11/1956 | Vitcha et al. | 285/317 X |
| 2,819,733 | 1/1958 | Maisch | 285/317 |
| 3,124,157 | 3/1964 | Krzewina . | |
| 3,124,373 | 3/1964 | Thompson | 285/308 X |
| 3,527,485 | 9/1970 | Goward et al. | 285/305 |
| 3,948,548 | 4/1976 | Voss | 285/39 X |
| 4,244,608 | 1/1981 | Stuemky . | |
| 4,423,892 | 1/1984 | Bartholomew | 285/305 X |
| 4,436,125 | 3/1984 | Blenkush . | |
| 4,500,118 | 2/1985 | Blenkush . | |
| 4,541,457 | 9/1985 | Blenkush . | |
| 4,613,112 | 9/1986 | Phlipot et al. . | |
| 4,630,847 | 12/1986 | Blenkush . | |
| 4,703,957 | 11/1987 | Blenkush . | |
| 4,869,534 | 9/1989 | Ketcham et al. . | |

FOREIGN PATENT DOCUMENTS

| | | |
|---|---|---|
| 1085731 | 7/1950 | Fed. Rep. of Germany . |
| 0265929 | 4/1950 | Switzerland . |
| 0387441 | 2/1933 | United Kingdom . |

OTHER PUBLICATIONS

Catalog of Nitto Kohki Co., Ltd., p. 38 and face page, entitled "Nitto Kohki's Footprints Represent the History of Couplers," labeled Exhibit A.

Primary Examiner—Dave W. Arola
Assistant Examiner—Heather Chun
Attorney, Agent, or Firm—Merchant, Gould, Smith, Edell, Welter & Schmidt

[57] ABSTRACT

A one piece female coupling member (24) having a front end and back end, the female coupling member (24) defining a path (34) for the flow of fluid therethrough. A male coupling member (22) having a front end and a back end and defining a path (32) for the flow of fluid therethrough, the front end of the male coupling member (22) being insertable into the front end of the female coupling member (24). A seal (36) cooperates with an external surface of the male coupling member (22) and an internal surface of the female coupling member (24) for providing a fluid tight seal therebetween. A one piece quick connecting/disconnecting clip member (26) is slidably mounted in a slot (58) of the female coupling member. The clip member (26) is slidable between a connecting position wherein it engages the male coupling member and a disconnecting position wherein it is disengaged from the male coupling member, the clip member (26) being biased toward the connecting position by a resilient biasing member (74).

15 Claims, 3 Drawing Sheets

TWO PIECE MOLDED FEMALE COUPLING

This is a continuation of application Ser. No. 07/519,339, filed May 2, 1990, which is a continuation of application Ser. No. 07/320,691, filed Mar. 23, 1989, now abandoned.

TECHNICAL FIELD OF THE INVENTION

The present invention relates to a coupling assembly for interconnecting fluid passageways and, more particularly, to a two piece molded female coupling member used in such a coupling assembly.

BACKGROUND OF THE INVENTION

Quick connect/disconnect coupling assemblies for small flexible tube applications and other applications are known in the art. Such couplings are utilized for bio-medical applications, convenience handling, beverage dispensing, instrument connections, photochemical handling, etc.

In applicant's U.S. Pat. No. 4,436,125 ('125), there is disclosed a quick connect/disconnect coupling assembly including cooperating female and male couplings, each defining a fluid passageway therethrough. The male coupling is constructed for releasable attachment to the female coupling. The male coupling includes a seal for providing a fluid tight seal between the male and female couplings. The female coupling includes a releasable locking or quick connecting/disconnecting mechanism for locking the male and female couplings together in a coupled state. The locking mechanism includes a locking collar or plate which is slidably mounted in grooves formed in the female coupling. The plate slides between a first or released position and a second or locked position. In the locked state, an inner edge of the plate extends into the bore of the female coupling and engages a groove or indentation in the surface of the male coupling so as to lock the male and female coupling together. As is illustrated and described in this patent, the locking mechanism includes several parts and is made of metal.

Nitto Kohki Co. Ltd. of Tokyo, Japan, illustrates on page 38 of its *Quick Connective Fluid Coupler* Catalog a coupling, referred to as a resin coupler, having a locking or quick connecting/disconnecting mechanism similar in many respects to that of U.S. Pat. No. 4,436,125. However, the quick connecting/disconnecting mechanism is molded and is comprised of a reduced number of parts. The female coupling and the connecting/disconnecting mechanism are comprised of three parts: the female coupling housing, a locking collar or plate, and a sleeve for retaining the locking collar on the female coupling. The sleeve further cooperates with the female connector housing to prevent the female and male couplings from separating when connected.

While the Nitto resin coupler has reduced the number of parts of its quick connecting/disconnecting mechanism as compared with the quick connecting/disconnecting mechanism of U.S. Pat. No. 4,436,125, there are some problems associated therewith. First, the steps required for assembling the three pieces of the female coupling would appear to be difficult to automate. Additionally, a tab-like structure is used to attach the sleeve to the female connector housing. This tab-like structure would not appear to be able to withstand high fluid pressures. Since the biasing member is an integral part of the female coupling which comes in contact with the fluid, the range of materials from which the female coupling is made will be limited to those materials with both the desired chemical and physical properties.

The present invention solves these and other problems associated with the prior art.

SUMMARY OF THE INVENTION

The present invention relates to a quick connecting/disconnecting coupling. The coupling includes a one piece female coupling member having a front end and a back end, the female coupling member defining a path for the flow of fluid therethrough. The quick connecting/disconnecting coupling further includes a male coupling member having a front end and a back end and defining a path for the flow of fluid therethrough. The front end of the male coupling member is insertable into the front end of the female coupling member. Seal means cooperates with an external surface of the male coupling member and an internal surface of the female coupling member for providing a fluid tight seal between the male and female coupling members upon insertion of the male coupling member into the female coupling member. A one piece quick connecting./disconnecting clip member is slidably mounted on the female coupling member. The clip member is slidable between a connecting position wherein it engages the male coupling member and a disconnecting position wherein it is disengaged from the male coupling member. When engaged with the male coupling member, the clip member retains the male and female coupling members in a coupled state. The clip member is biased by a resilient biasing member toward the connecting position.

One advantage of the preferred embodiment of the present invention is the provision of a quick connecting/disconnecting coupling having a reduced number of parts and in particular a one piece female coupling member and one piece clip means for interconnecting the female coupling member to a male coupling member. As a result of the reduced number of parts, the female coupling member facilitates assembly and is less likely to fail because it has fewer operative components. Moreover, as a result of the simplicity of the design, the cost of manufacture will be less.

Yet another advantage of the present invention is that a separate sleeve is not required to retain the clip member in position on the female coupling member. This is unlike the Nitto Kohki Co. Ltd. product wherein a separate and distinct sleeve member is required to retain the clip member in position.

Additionally, yet another advantage of the present invention is that it can be used with a great range of materials since the clip member does not come in contact with the fluid. Thus, the male and female coupling members can be made of a material chemically compatible with the fluids being transferred while the clip member can be made of a material selected for its physical properties required in its connecting function; i.e., stiffness and resiliency. Accordingly, the quick connecting/disconnecting coupling of the present invention can be used in many diverse applications utilizing different types of fluids with a broad range of characteristics. In the Nitto Kohki coupling, the biasing member is part of the female coupling and thus this limits the choice of materials to those which are both chemically compatible with the fluids being transferred and having the suitable physical properties of the connecting function; i.e., stiffness and resiliency.

The preferred embodiment of the present invention is preferably made of molded plastic, but alternative embodiments could be made of metal.

Yet another advantage of the present invention is that it provides for relatively high fluid flow capability despite its compact size.

Still another advantage of the present invention is that it allows for use with high fluid pressures since the clip member engages the male member so as to provide a very secure connection between the female coupling member and the male coupling member. For example, various embodiments of the present invention might be utilized with fluid pressures in the 900 psi range.

Yet another advantage of the present invention is that it provides, in the preferred embodiment, an audible feedback when the clip member slides into the connecting position so as to connect the male and female coupling members together in the coupled state.

Additionally, the relatively few parts make the present invention more adaptable to automatic assembly.

These and various other advantages and features of novelty which characterize the invention are pointed out with particularity in the claims annexed hereto and forming a part hereof. However, for a better understanding of the invention, its advantages and objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

Referring now to the drawings wherein like reference numerals indicate corresponding parts throughout the several views.

DETAILED DESCRIPTION OF THE PREFERRED EMBODIMENT

Figure 1:
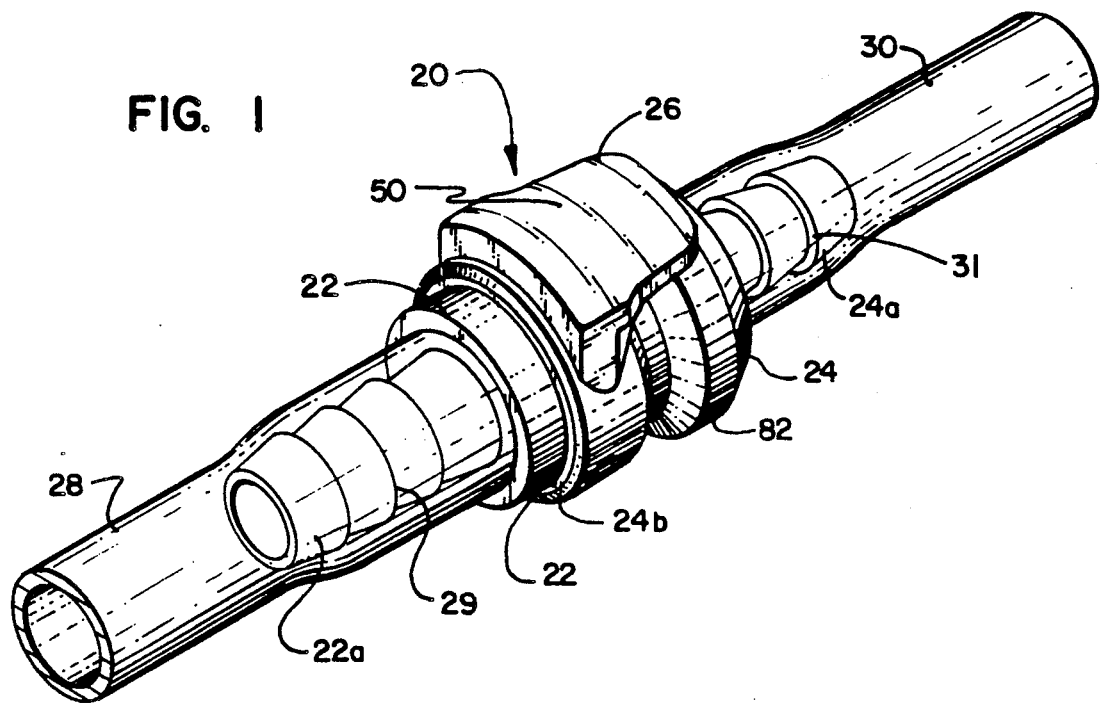
FIG. 1 is a perspective view of a preferred embodiment of a quick connecting/disconnecting coupling in accordance with the present invention being illustrated connecting two pieces of tubing.

Referring now to the drawings, there is illustrated in FIGS. 1-5 a preferred embodiment of a quick connecting/disconnecting coupling in accordance with the principles of the present invention, the quick connecting/disconnecting coupling being generally referenced by the reference numeral 20. The coupling 20 includes a male coupling member 22 and a female coupling member 24, the male coupling member 22 including a back end portion 22a and a front end portion 22b and the female coupling member 24 including a back end 24a and a front end 24b. A locking collar, herein referred to as a quick connecting/disconnecting clip member 26, is used to quickly disconnect and connect the male and female coupling members 22, 24.

In the environmental illustration of FIG. 1, the quick connecting/disconnecting coupling 20 is illustrated as being interconnected to two pieces of tubing 28, 30. The tubing 28, 30 is attached to barbed ends 29, 31 of the male and female coupling members 22, 24, respectively. It will be appreciated, however, that the quick connecting/disconnecting coupling 20 of the present invention has numerous uses other than connecting two pieces of tubing together.

In the preferred embodiment shown, the male coupling member 22 and the female coupling member 24 define paths 32, 34, respectively, for the flow of fluid therethrough. An O-ring seal 36 is disposed in a circumferential groove about the exterior surface of the male coupling member 22 for providing a fluid tight seal between the exterior surface of the male coupling member 22 and the interior surface of the female coupling member 24 when in the connected state. Although the preferred embodiment of the present invention is described as being used with respect to fluid flow paths, it will be appreciated that the present invention might have other uses such as interconnecting electrical wires or the like.

Figure 6:
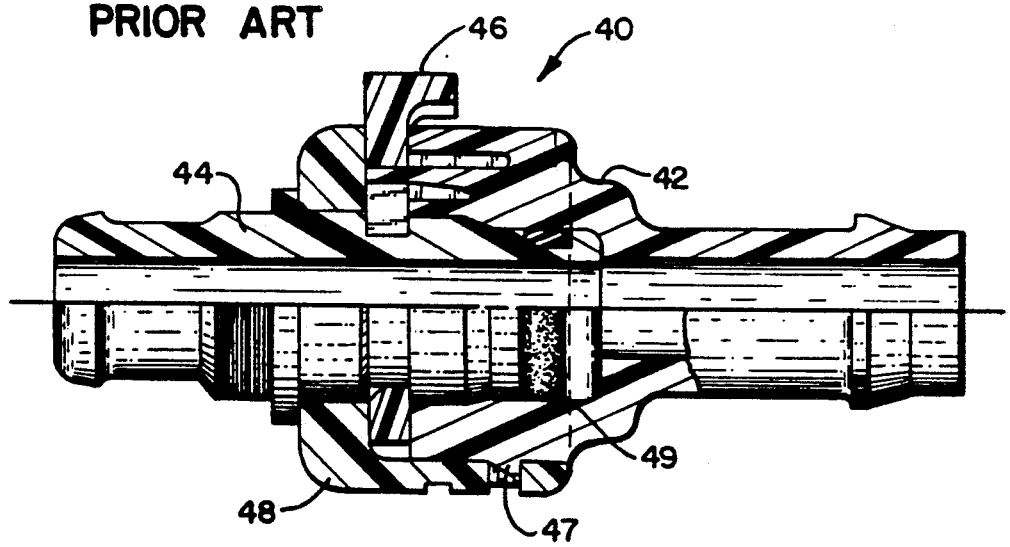
FIG. 6 is a view with portions shown in cross section and in side elevation of a prior art quick connecting/disconnecting coupling, made by Nitto Kohki Co. Ltd. of Tokyo, Japan.
Figure 7:
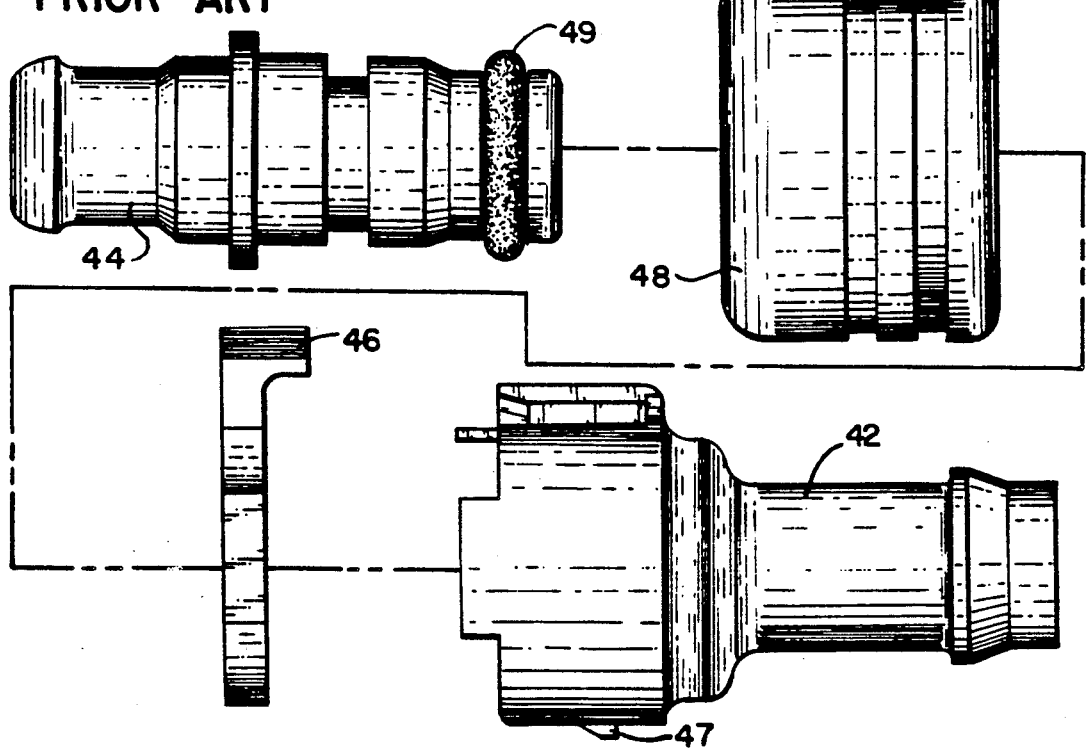
FIG. 7 is an exploded view of the prior art quick connecting/disconnecting coupling shown in FIG. 6.

Illustrated in FIGS. 6 and 7 is a prior art quick connecting/disconnecting coupling which is sold by Nitto Kohki Co. Ltd. of Tokyo, Japan. This quick connecting/disconnecting coupling is generally referenced by the reference numeral 40 and includes a female coupling member 42, a male coupling member 44, a clip member 46, a sleeve member 48, and an O-ring seal 49. This prior art quick connecting/disconnecting coupling requires the separate and distinct sleeve 48 for retaining the clip member 46 on the female coupling member 42 and for cooperating with a tab 47 on the female coupling member 42 to maintain the male and female coupling members 44, 42 in a coupled state when fluid pressure is applied. The present invention, in addition to other differences, eliminates the need for the separate and distinct sleeve 48, thereby providing the present invention with numerous advantages over the prior art, some of which were discussed above.

Figure 2:
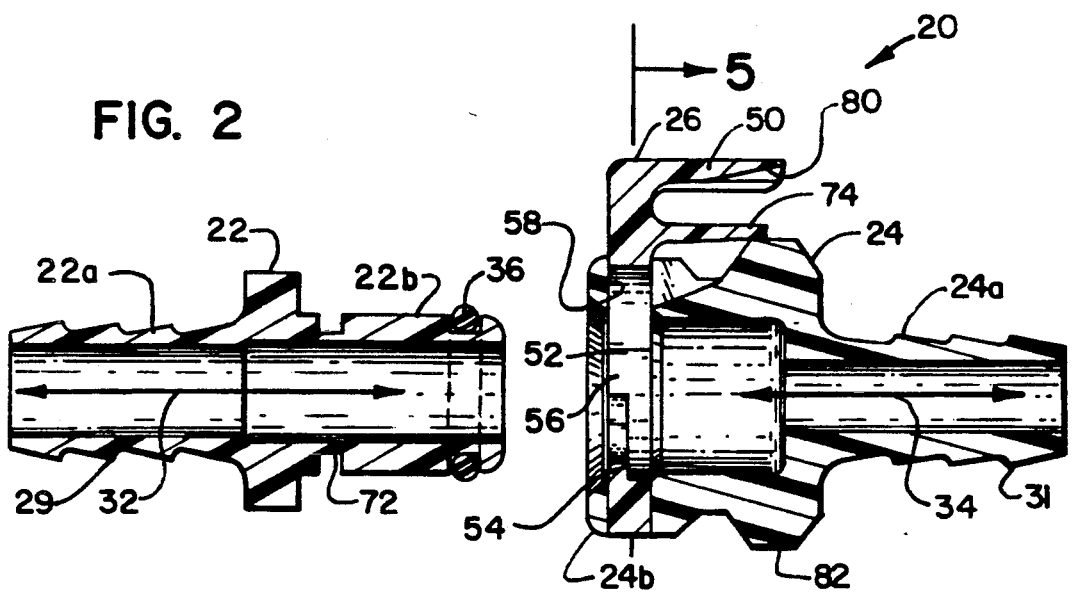
FIG. 2 is a cross sectional view of the embodiment shown in FIG. 1 with the male and female coupling members being uncoupled and separated from one another, the male coupling member being in axial alignment with the female coupling member.
Figure 3:
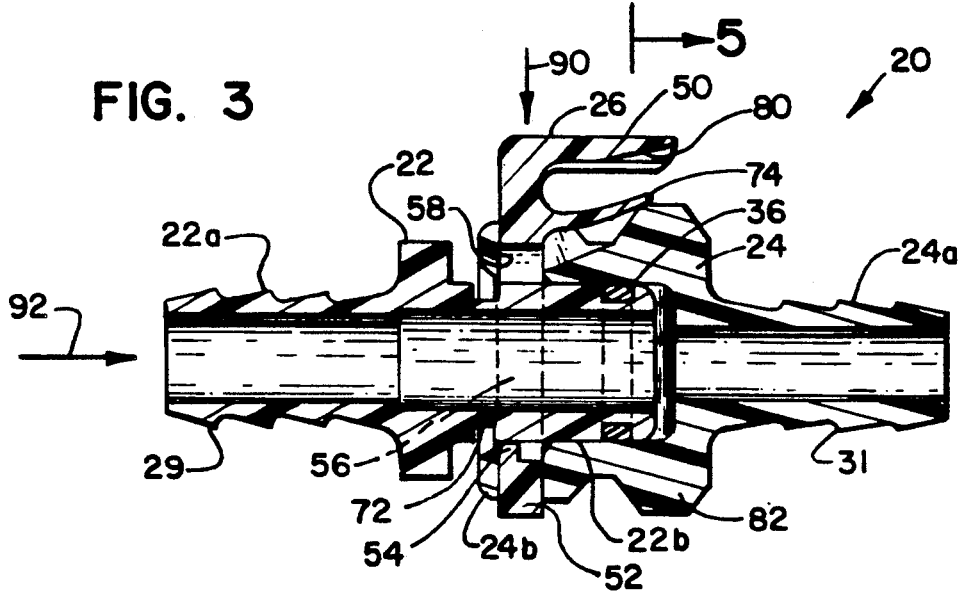
FIG. 3 is a cross sectional view of the embodiment shown in FIG. 1 with the male coupling member being partially inserted into the female coupling member, the quick connecting/disconnecting clip member being illustrated in the disconnecting position.
Figure 4:
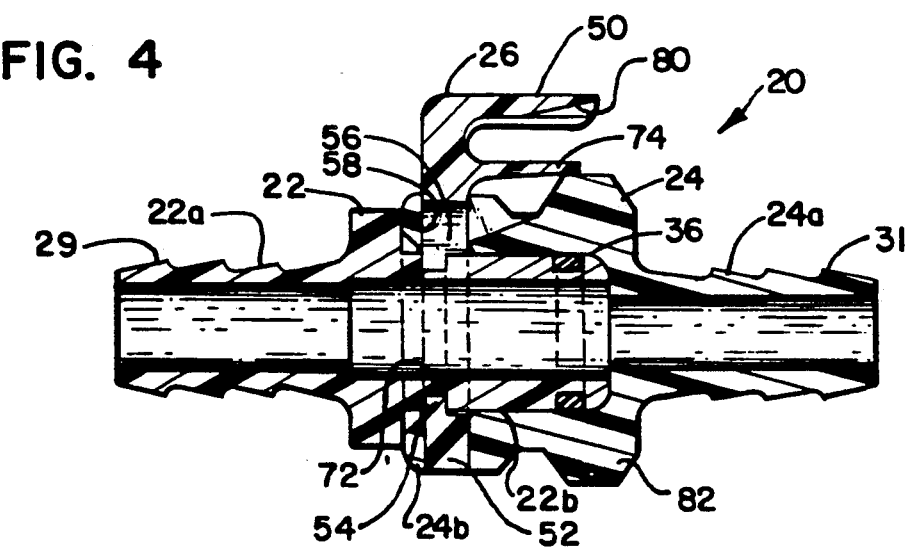
FIG. 4 is a view similar to FIG. 3 illustrating the male and female coupling members being coupled, the clip member being in the connecting position.

Referring now more particularly to FIGS. 2-5, the male coupling member 22, the female coupling member 24, and the clip member 26 are each preferably made as a one piece molded plastic component in the preferred embodiment. The clip member 26 includes a tab portion 50 and a plate portion 52 interconnected to each other at roughly a right angle in a generally L-shaped configuration. The tab portion 50 provides a surface for the user to press down on the clip member 26 as generally illustrated in FIG. 3 so as to place the clip member 26 in the disconnecting position when inserting the male coupling member 22. In some embodiments of the present invention, it is not necessary to manually force down on the clip member 26 when inserting the male coupling member 22 as the male coupling member 22 upon engagement with a curvilinear inner edge 54 of the plate portion 52 will force the clip member 26 down into the disconnecting position. The plate portion 52 defines an aperture 56 sufficiently large to allow the front end portion 22b of the male coupling member 22 to extend therethrough and is generally alignable with the fluid pathway 34 of the female coupling member 24. The plate portion 52 slides in a slot 58 extending transversely of the female coupling member 24. The slot 58 is wider proximate its bottom portion 58a than its top portion 58b. The side surfaces 60 of the female coupling member 24 which define the slot 50 include shoulder portions 62 at the intersection of the wide portion of the slot 58 with the narrow portion of the slot 58. The plate portion 52 of the clip member 26 in turn includes barbed projections 64 along its side edges 66. The barbed projection 64 includes a substantially flat portion 68 for engaging the shoulder portion 62 of the female coupling member 24 so as to prevent the clip member 20 from being inadvertently removed from the female coupling member 24 after it has been inserted. This assures that the clip member 26 will remain with the female coupling member 24 at all times in typical use. The bottom of the plate portion 52 has a curvilinear surface 70 which generally matches that of the curvilinear surface of the female coupling member. The curvilinear inner edge portion 54 of the plate portion 52 has a lesser thickness than the rest of the plate portion 52. The curvilinear inner edge 54 rests in a circumferential groove 72 of the male coupling member 22 when in the connecting position as generally illustrated in FIG. 4.

A resilient biasing member 74 is disposed below the tab portion 50. Upon pressing down on the clip member 26 as generally illustrated in FIG. 3, the resilient biasing member 74 is displaced from its at rest position to a displaced position. The clip member 26 is then biased upwardly such that when the groove 72 of the male coupling member is aligned with the curvilinear inner edge 54 of the clip member 26, the resilient biasing member 74 will force the clip member 26 upward into engagement with the groove 72 thereby placing the clip member 26 into the connecting position and retaining the male and female coupling members in a coupled state upon the application of fluid pressure. As illustrated in FIG. 2, an under surface 80 of the tab portion 50 is slanted so as to provide additional clearance between the resilient biasing member 74 and the under surface of the tab portion 50. In addition, a female coupling member includes a raised surface 82 which the distal end of the resilient biasing member 74 engages so as to provide clearance between the remainder of the resilient biasing member 74 and the female coupling member such that the clip member 26 can be depressed downwardly.

Figure 5:
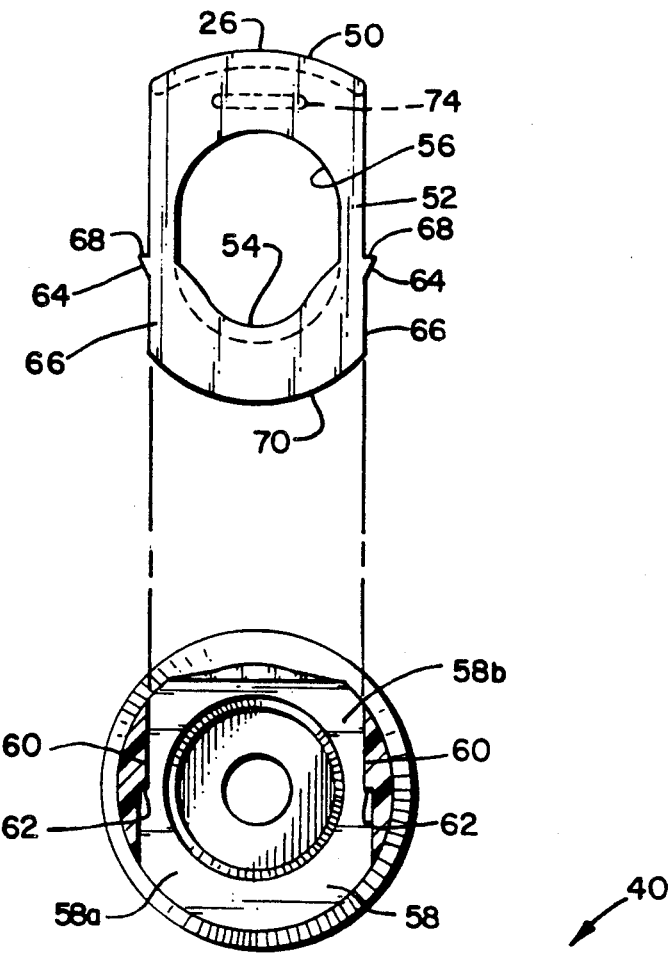
FIG. 5 is a transverse sectional view taken generally along line 5—5 of FIG. 2 of the female coupling member illustrating the clip member removed therefrom and aligned for insertion into the clip member receiving slot of the female coupling member.

The quick connecting/disconnecting coupling 20 of the present invention is preferably molded as three separate pieces, the male coupling member 22, the female coupling member 24, and the clip member 26. The coupling 20 can be made of numerous types of material such as plastic or metal. An acetal plastic, such as Delrin ®, is one type of plastic that might be used for the clip member while polypropylene might be used for the male and female coupling members because of its chemical properties. The clip member is then inserted into the slot 58 of the female coupling member as generally illustrated in FIG. 5. Throughout its use, the clip member 26 will be retained with the female coupling member 24 by the barbed projections 64 interacting with the shoulder portions 62 of the female coupling member 24. The clip member 26 will normally be in its connecting position when the resilient biasing member is in its rest position. To insert a male coupling member, the clip member 26 is depressed as illustrated by an arrow 90 in FIG. 3 and the male coupling member 22 is then inserted into the female coupling member 24 as generally illustrated by the arrow 92 in FIG. 3. The clip member 26 is then released. Upon alignment of the circumferential groove 72 with the inner edge portion 56, the clip member 26 will be biased upward into its connecting position by the resilient biasing member 74 as generally illustrated in FIG. 4 wherein the coupling 20 is illustrated in a coupled state. In some embodiments, by merely inserting the male coupling member 22, the clip member 26 will be forced down into its disconnecting position thereby doing away with the need for the user to press down on the tab portion 50 of the clip member 26. In some embodiments, once the male coupling member 22 is inserted far enough to align the groove 72 with the edge portion 54 of the clip member, the coupling 20 will generate an audible signal as the clip member 26 snaps into its connecting position. To uncouple the coupling, the user simply presses down on the clip member 26 and removes the male coupling member 22.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A quick connecting/disconnecting coupling, comprising:

a) a one piece female coupling member having a front end and a back end, the female coupling member defining a path for the flow of fluid therethrough;

b) a male coupling member having a front end and a back end and defining a path for the flow of fluid therethrough, the front end of the male coupling member being insertable into the front end of the female coupling member;

c) seal means cooperating with an external surface of the male coupling member and an internal surface of the female coupling member for providing a fluid tight seal therebetween; and d) a one piece integrally molded quick connecting-/disconnecting clip member slidably mounted on the female coupling member including means for retaining said clip member in the female coupling member, the clip member slidable between a connecting position wherein it engages the male coupling member and a disconnecting position wherein it is disengaged from the male coupling member, the clip member further including an integral resilient biasing member, the clip member being biased toward the connecting position by the biasing member, the clip member further including a plate portion, the plate portion defining an aperture alignable with the male coupling member and of larger diameter than the front end portion of the male coupling member, the resilient biasing member engaging the female coupling member proximate a distal end of the resilient biasing member, clearance being provided between the biasing member and the female coupling member intermediate of the distal end of the resilient biasing member and a point of attachment to the clip member.

2. A quick connecting/disconnecting coupling in accordance with claim 1, wherein the clip member is slidably disposed in a slot extending transversely of the female coupling member, the male coupling member having a recess in its surface alignable with the slot upon insertion of the male coupling member a predetermined distance into the female coupling member.

3. A quick connecting/disconnecting coupling in accordance with claim 2, wherein the slot is of greater width proximate a lower end than an upper end, the clip member including projections disposed along its side edges engageable with shoulder portions of the slot at the intersection of the upper and lower end.

4. A quick connecting/disconnecting coupling in accordance with claim 2, wherein the clip member includes a tab portion.

5. A female coupling member, comprising:
   a) a one piece integrally molded plastic housing having a front end and a back end and defining a path for the flow of fluid therethrough, a slot being defined in said housing and extending generally transversely of the housing; and
   b) a one piece integrally molded quick connecting-/disconnecting clip member slidably mountable in the housing slot, the clip member being retained against axial movement by the housing, the clip member being slidable between a first position and a second position, the clip member projecting into the fluid pathway where said clip member is engageable with a male coupling member to hold the male coupling member within the front end of the female coupling member when in the second position, the clip member further including a plate portion extending generally transversely of the female coupling, the plate portion defining an aperture therein alignable with the male coupling member, the clip member further including an integral resilient biasing member having an at rest position, the resilient biasing member being displaced from its at rest position and in a displaced position when the clip member is in the first position, the biasing member tending to bias the clip member back to the second position when in the displaced position, the resilient biasing member engaging the housing proximate a distal end of the resilient biasing member, clearance being provided between the biasing member and the housing intermediate of the distal end of the resilient biasing member at the point of attachment to the clip member.

6. A female coupling member in accordance with claim 5, wherein the clip member has a tab portion extending generally axially of the female coupling member.

7. A female coupling member in accordance with claim 6, wherein the resilient biasing member extends generally axially of the housing.

8. A female coupling member in accordance with claim 7, wherein the housing is cut partially away to provide additional clearance between the resilient biasing member and the housing.

9. A female coupling member in accordance with claim 7, wherein the tab portion and plate portion of the clip member and the housing are more rigid than the resilient biasing member.

10. A female coupling member in accordance with claim 7, wherein the housing is provided with a raised surface, the raised surface cooperating with the distal end of the resilient biasing member to restrict transverse movement of the distal end of the biasing member toward the fluid pathway of the housing.

11. A female coupling member in accordance with claim 7, wherein the plate portion includes an edge portion of less thickness than the plate portion which projects into the fluid pathway in the second position.

12. A female coupling member in accordance with claim 7, wherein the clip member receiving slot extends transversely through the female coupling housing.

13. A female coupling member in accordance with claim 7, wherein the plate portion includes projections cooperating with the housing to retain the clip member in the housing.

14. A female coupling member in accordance with claim 7, wherein the plate portion includes oppositely facing, substantially flat major surfaces and spaced apart side edges, the projections including barbed portions located along the side edges of the plate member engageable with shoulder portions along sides of the clip member receiving slot.

15. A female coupling member, comprising:
   a) a one piece integrally molded plastic housing having a front end and a back end and defining a path for the flow of fluid therethrough, a slot being defined in said housing and extending generally transversely of the housing, the housing defining shoulder portions within the slot; and
   b) a one piece integrally molded quick connecting-/disconnecting clip member slidably mountable in the housing slot, the clip member including a plate portion, the plate portion defining an aperture therein alignable with a male coupling member and of larger diameter than the front end portion of a male coupling member, the clip member including outwardly extending projection means disposed along its outer side edges engageable with the shoulder portions within the slot for retaining the clip member in the housing, the clip member being slidable between a second position wherein it is engageable in the housing path with a male coupling member and a first position wherein it is disengageable from a male coupling member, the clip member being biased into the second position from the first position.

* * * * *

UNITED STATES PATENT AND TRADEMARK OFFICE
CERTIFICATE OF CORRECTION

PATENT NO. : 5,104,158
DATED : April 14, 1992
INVENTOR(S) : Meyer et al.

It is certified that error appears in the above-indentified patent and that said Letters Patent is hereby corrected as shown below:

Column 1, line 6; "Mar. 23, 1989" should read
--Mar. 13, 1989--.

Signed and Sealed this

Fourteenth Day of December, 1993

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,104,158  
APPLICATION NO. : 07/708457  
DATED : April 14, 1992  
INVENTOR(S) : Meyer et al.

Page 1 of 1

It is certified that error appears in the above-identified patent and that said Letters Patent is hereby corrected as shown below:

On the Title Page

In the item [*] Notice: "Oct. 1, 2008" should read

--Mar. 13, 2009--.

Signed and Sealed this  
Fourth Day of June, 2013

Teresa Stanek Rea  
*Acting Director of the United States Patent and Trademark Office*